US012699230B2

(12) United States Patent
Sakaguchi et al.

(10) Patent No.: US 12,699,230 B2
(45) Date of Patent: Aug. 4, 2026

(54) CLEANING TOOL FOR AN OPTICAL CONNECTOR

(71) Applicant: Fujikura Ltd., Tokyo (JP)

(72) Inventors: Yuya Sakaguchi, Chiba (JP); Shunsuke Fujita, Chiba (JP); Kunihiko Fujiwara, Chiba (JP)

(73) Assignee: Fujikura Ltd., Tokyo (JP)

( * ) Notice: Subject to any disclaimer, the term of this patent is extended or adjusted under 35 U.S.C. 154(b) by 307 days.

(21) Appl. No.: 17/922,070

(22) PCT Filed: Apr. 13, 2021

(86) PCT No.: PCT/JP2021/015274
§ 371 (c)(1),
(2) Date: Oct. 28, 2022

(87) PCT Pub. No.: WO2022/004096
PCT Pub. Date: Oct. 6, 2022

(65) Prior Publication Data
US 2023/0180377 A1 Jun. 8, 2023

(30) Foreign Application Priority Data
Jul. 1, 2020 (JP) ................................. 2020-114300

(51) Int. Cl.
*G02B 6/38* (2006.01)
*B08B 6/00* (2006.01)
*H05F 3/00* (2006.01)

(52) U.S. Cl.
CPC .............. *G02B 6/3866* (2013.01); *B08B 6/00* (2013.01); *G02B 6/381* (2013.01); *H05F 3/00* (2013.01); *B08B 2240/02* (2013.01)

(58) Field of Classification Search
CPC ......... B08B 2240/02; B08B 6/00; H05F 3/00; G02B 6/3866
See application file for complete search history.

(56) References Cited

U.S. PATENT DOCUMENTS

2003/0098045 A1* 5/2003 Loder ....................... B08B 1/30
                                                    15/210.1
2004/0088813 A1   5/2004 Cox
2015/0253516 A1* 9/2015 Miura .................. G02B 6/3866
                                                    15/105
(Continued)

FOREIGN PATENT DOCUMENTS

JP        H09105835 A      4/1997
JP        2002-31739 A     1/2002
(Continued)

OTHER PUBLICATIONS

International Search Report issued in corresponding International Application No. PCT/JP2021/015274 mailed Jul. 6, 2021 (4 pages).
(Continued)

*Primary Examiner* — C. A. Rivera
(74) *Attorney, Agent, or Firm* — Osha Bergman Watanabe & Burton LLP

(57) ABSTRACT

A cleaning tool includes: a tool body; and an extension part extending from the tool body and including a head configured to press a cleaning body against a cleaning target. The head includes a conductor part made of a conductor.

10 Claims, 11 Drawing Sheets

(56)     References Cited

U.S. PATENT DOCUMENTS

2017/0059788 A1 *   3/2017   Nakane ................ G02B 6/3866
2023/0273374 A1 *   8/2023   Fujita ..................... B08B 11/00
                                                          134/6

FOREIGN PATENT DOCUMENTS

JP          2004-121974  A        4/2004
JP          2004354621   A   *  12/2004
JP          2005-134772  A        5/2005
JP          2006272223   A   *  10/2006
JP          2013-210404  A      10/2013
JP             5439557   B2      3/2014
JP          2017-49396   A        3/2017
KR        20100010977   U   *  11/2010   ............... G02F 1/13
WO       WO-2020059853 A1 *   3/2020   ............. B08B 1/008

OTHER PUBLICATIONS

Written Opinion issued in corresponding International Application
No. PCT/JP2021/015274 mailed Jul. 6, 2021 (4 pages).

* cited by examiner

UP

FRONT ←→ REAR

DOWN

10

30          20

40  31A

10

30          20

40  31A 100          10

PUSHING          PULLING
OPERATION          OPERATION 101  31A

FRONT ◄────► REAR

FRONT ◄───► REAR

CLEANING TOOL FOR AN OPTICAL CONNECTOR

TECHNICAL FIELD

The present invention relates to a cleaning tool.

BACKGROUND

When dust or the like attaches to an optical connector, the dust or the like causes an increase in optical signal loss and the like and cleaning of the optical connector thus becomes necessary. PTL 1 describes a cleaning tool used to clean an optical connector. The cleaning tool described in PTL 1 includes a tool body and an extension part with a head. The optical connector is cleaned with a cleaning body by moving the tool body relative to the extension part while pressing the cleaning body against the optical connector with a pressing surface of the head, and the cleaning body is supplied and retrieved by utilizing movement of the tool body and the extension part relative to each other.

PATENT LITERATURE

[PTL 1] JP 5439557B

In the cleaning tool described in PTL 1, in the supplying and retrieving of the cleaning body, the cleaning body moves relative to the pressing surface of the head while being in contact with the pressing surface of the head. In this case, the pressing surface of the head and the cleaning body are sometimes charged due to generation of static electricity. When the charged state of the pressing surface of the head and the cleaning body is maintained, dust is attracted to the charged head and the cleaning body and sometimes also to the optical connector.

SUMMARY

One or more embodiments of the present invention suppress a case where a charged state of a cleaning body and a pressing surface of a head is maintained.

According to one or more embodiments of the present invention, a cleaning tool comprises: a tool body; and an extension part extending from the tool body and having a head configured to press a cleaning body against a cleaning target, wherein the head includes a conductor part made of a conductor.

Other characteristics of the present invention will be made apparent by the description and the illustration of the drawings to be described later.

According to some of the embodiments of the present invention, it is possible to suppress a case where a charged state of a cleaning body and a pressing surface of a head is maintained.

DETAILED DESCRIPTION

Figure 1A:
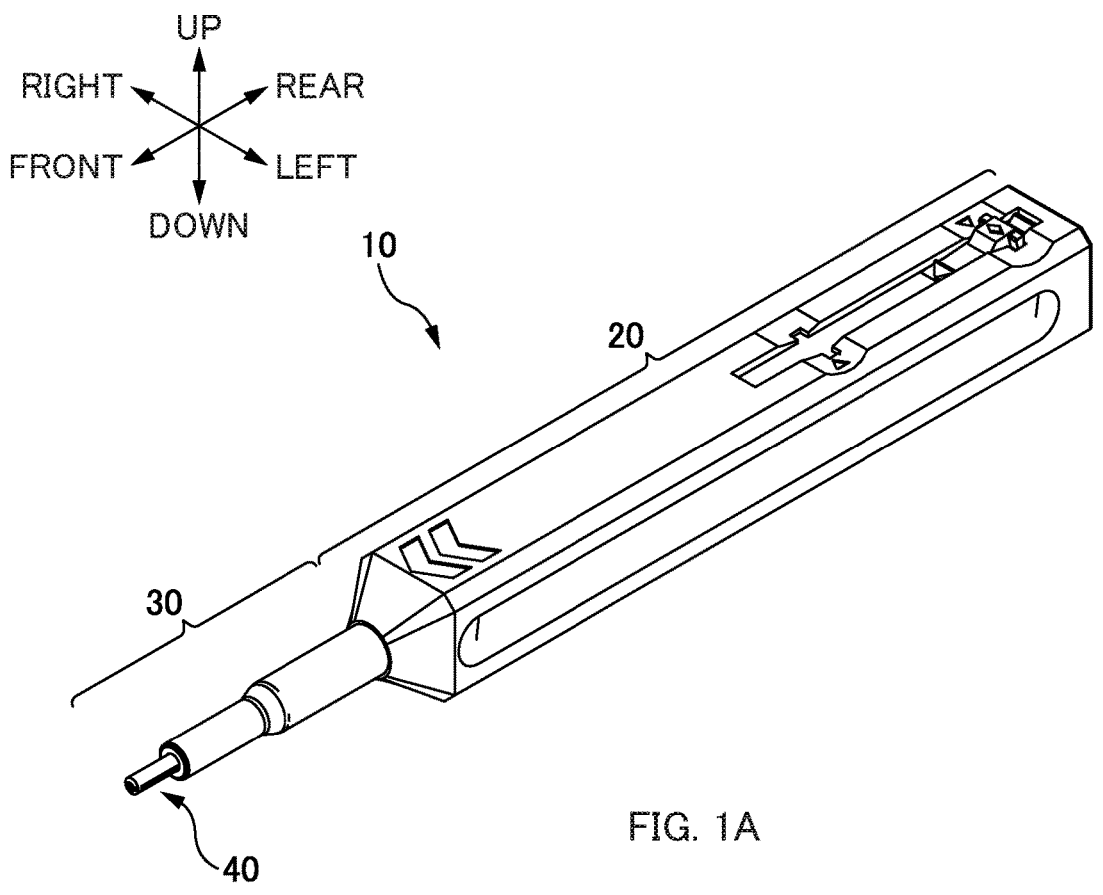
FIG. 1A is a perspective view of a cleaning tool 10 in first embodiments.

At least the following matters will be apparent from the description and the illustration of the drawings to be described below.

It will be apparent that the cleaning tool comprising: a tool body; and an extension part extending from the tool body and having a head configured to press a cleaning body against a cleaning target, wherein the head includes a conductor part made of a conductor. The cleaning tool as described above can suppress a case where a charged state of the cleaning body and a pressing surface of the head is maintained.

The conductor part may be placed on a pressing surface of the head. This configuration facilitates removal of charges from the cleaning body and the pressing surface of the head.

The cleaning body may be wrapped around the pressing surface, and the conductor part may be placed in a region of the pressing surface where the cleaning body is wrapped around as viewed in a direction in which the head presses the cleaning body against the cleaning target. This configuration can suppress contact of the conductor part with the cleaning target when the head presses the cleaning body against the cleaning target.

The head may include a supply opening from which the cleaning body is supplied to the pressing surface and a retrieve opening to which the cleaning body is retrieved from the pressing surface, and the conductor part may be placed between the supply opening and the retrieve opening. This configuration can suppress contact of the conductor part with the cleaning target when the head presses the cleaning body against the cleaning target.

The cleaning body may be formed in a string shape, and the head may further include a head body made of a resin. This configuration causes the head body to come into contact with the cleaning target and can thereby suppress breakage of the cleaning target while suppressing contact of the conductor portion with the cleaning target when the head presses the string-shaped cleaning body against the cleaning target.

The cleaning body may be formed in a tape shape, and the head may be made of the conductor. This configuration further facilitates removal of charges from the cleaning body and the pressing surface of the head when the head presses the tape-shaped cleaning body against the cleaning target.

The tool body may include an operation part configured to be operated by an operator, and the conductor part of the head may be at least partially electrically coupled to the operation part. This configuration enables removing electric charges from the cleaning tool.

The tool body may include a ground terminal, and the conductor part of the head may be capable of being grounded via the ground terminal. This configuration enables removing electric charges from the cleaning tool.

The cleaning tool may further comprise a feeding mechanism configured to supply the cleaning body to the head in a state where the head is pressing the cleaning body against the cleaning target. This configuration enables the cleaning body to move relative to the pressing surface of the head while being in contact with the pressing surface of the head.

First Embodiments

<Overall Configuration of Cleaning Tool 10>

Figure 1B:
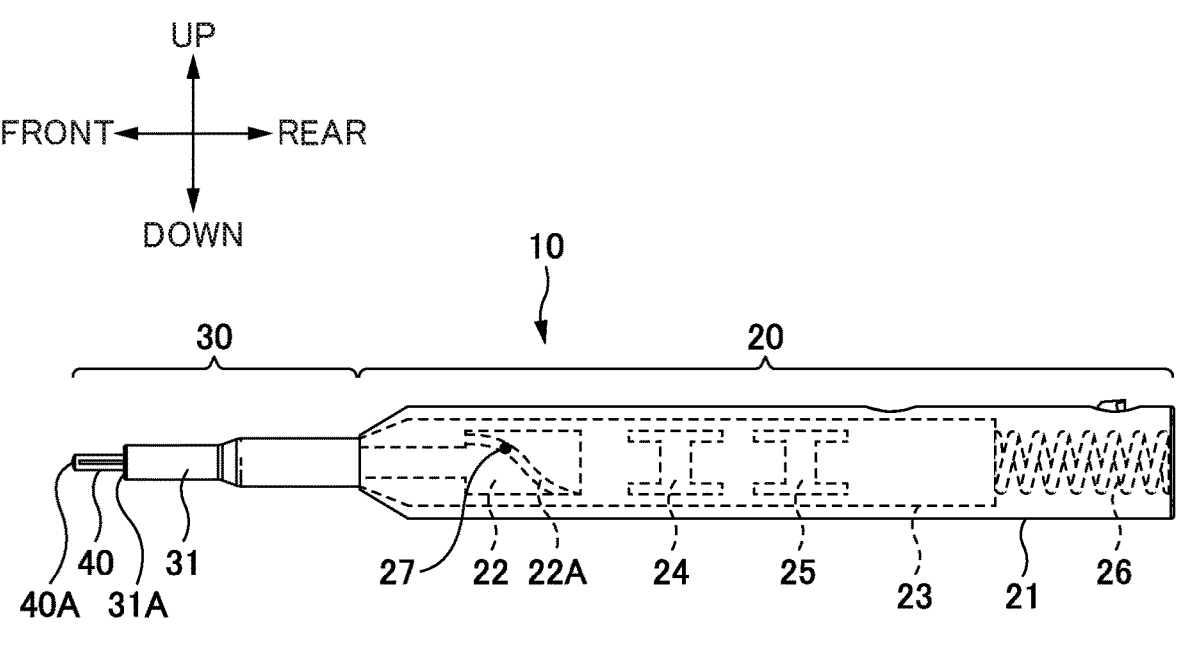
FIG. 1B is a schematic explanatory view of an internal configuration of a tool body 20.
Figure 2A:
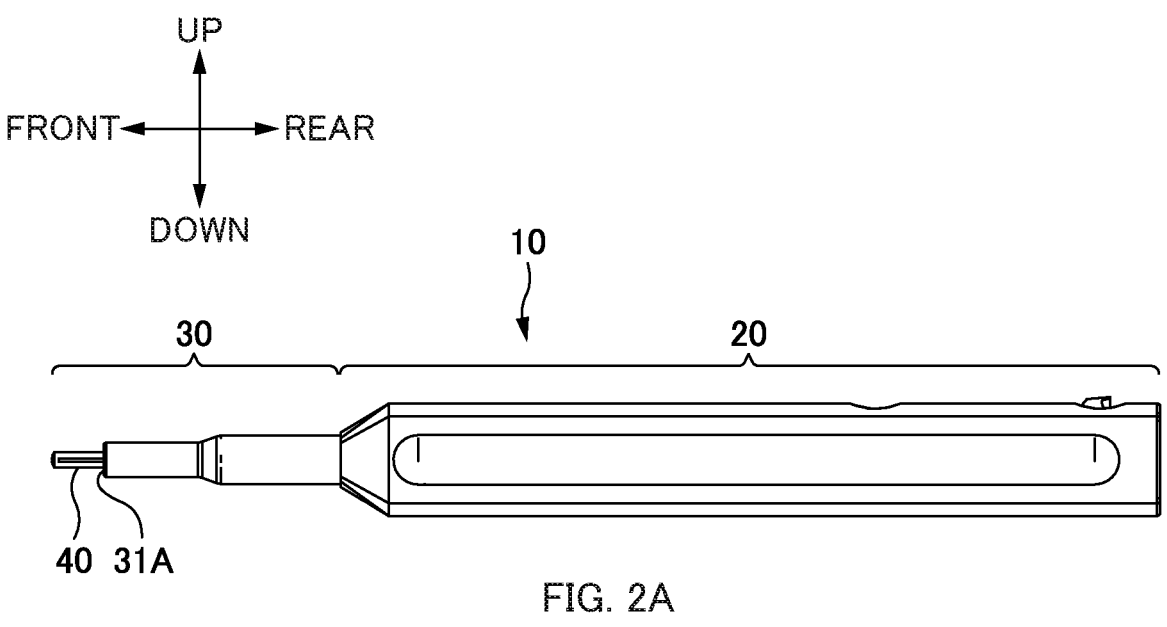
FIG. 2A is a side view of the cleaning tool 10 in a normal state.
Figure 2B:
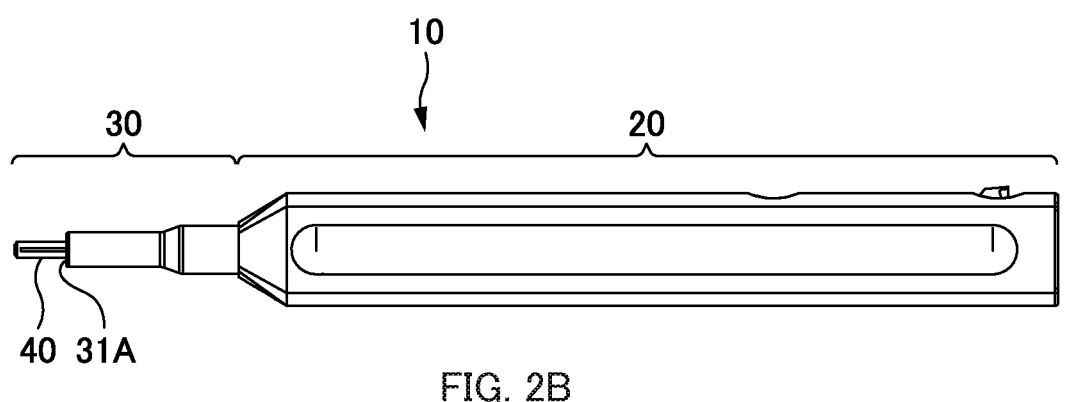
FIG. 2B is a side view of the cleaning tool 10 in a pushed state.
Figure 2C:
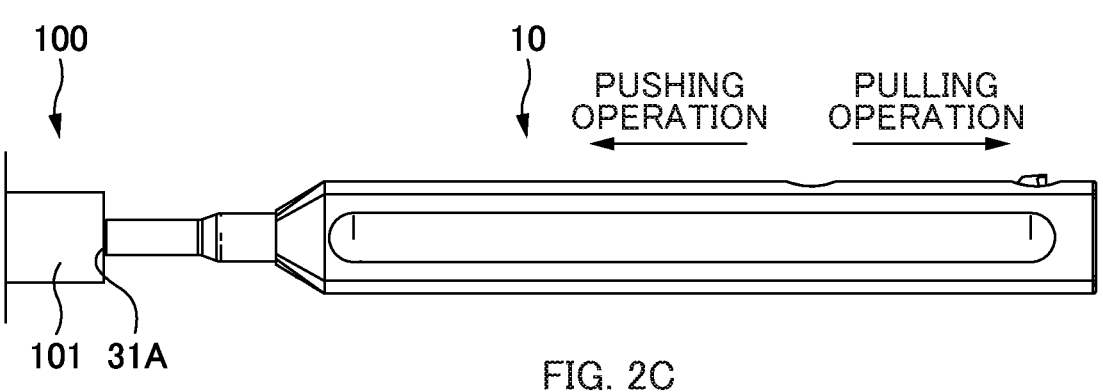
FIG. 2C is an explanatory view of a cleaning operation.

FIG. 1A is a perspective view of a cleaning tool 10 in first embodiments. FIG. 1B is a schematic explanatory view of an internal configuration of a tool body 20. FIG. 2A is a side view of the cleaning tool 10 in a normal state. FIG. 2B is a side view of the cleaning tool 10 in a pushed state. FIG. 2C is an explanatory view of a cleaning operation.

Description is sometimes given below according to the directions illustrated in FIGS. 1A and 1B. Specifically, a direction in which an extension part 30 extends out from the tool body 20 is referred to as "front-rear direction", the side of the extension part 30 as viewed from the tool body 20 is referred to as "front", and the opposite side to the front is referred to as "rear". Note that the front-rear direction is also a direction in which the tool body 20 and the extension part 30 move relative to each other. An axial direction of a rotation axis of a supply reel 24 (or a take-up reel 25) in the tool body 20 is referred to as "up-down direction". Moreover, a direction orthogonal to the "front-rear direction" and the "up-down direction" is referred to as "left-right direction" and the right side in a view from the rear side to the front side is referred to as "right" and the left side in the view from the rear side to the front side is referred to as "left".

Figure 5A:
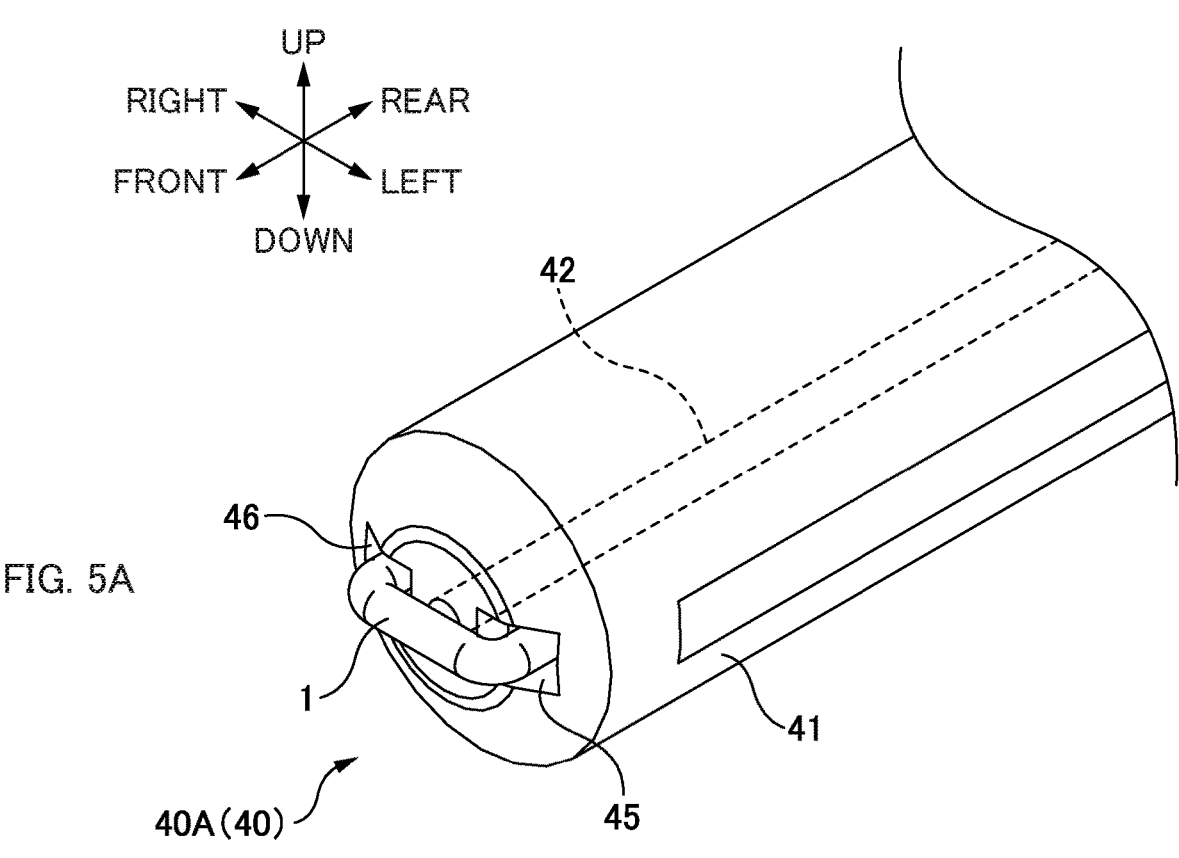
FIGS. 5A and 5B are perspective views of a portion around a head 40 of the cleaning tool 10 in the first embodiments.
Figure 6A:
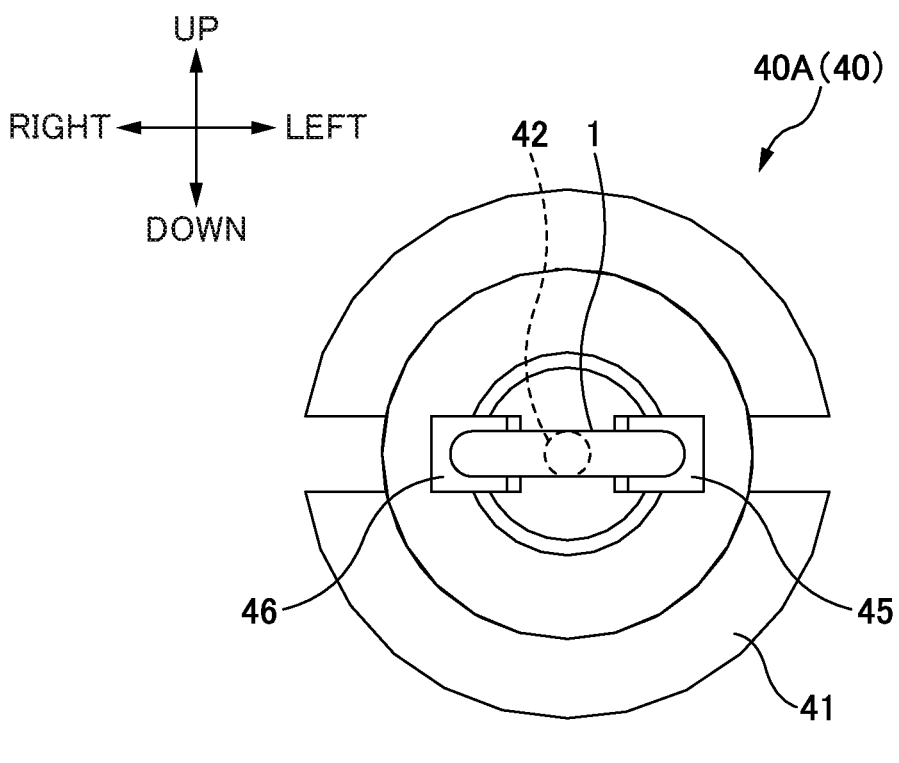
FIGS. 6A and 6B are front views of the head 40 of the cleaning tool 10 in the first embodiments.

The cleaning tool 10 is a tool used to clean an optical connector 100. Specifically, the cleaning tool 10 is a tool for cleaning a coupling end face of a ferrule of the optical connector 100 and an end portion of an optical fiber held by the ferrule. Note that the cleaning tool 10 may be a tool for cleaning portions other than the coupling end face of the ferrule and the end portion of the optical fiber. A cleaning target of the cleaning tool 10 in the first embodiments is the single-core type optical connector 100. Moreover, in the cleaning tool 10 of the first embodiments, a string-shaped cleaning body 1 as illustrated in FIGS. 5A and 6A is used. The cleaning tool 10 includes the tool body 20 and the extension part 30.

Before giving description about details of configurations of the cleaning tool 10 in one or more embodiments, description is given of a cleaning operation performed when the optical connector 100 is cleaned by using the cleaning tool 10. In one or more embodiments, the tool body 20 and the extension part 30 can move relative to each other in the front-rear direction. Moreover, the cleaning tool 10 includes a rotation mechanism that rotates a head 40 in a rotating direction about an axis extending in the front-rear direction by utilizing the movement of the tool body 20 and the extension part 30 relative to each other. Furthermore, the cleaning tool 10 includes a feeding mechanism that supplies the unused cleaning body 1 to a pressing surface 40A of the head 40 in the extension part 30 illustrated in FIG. 1A and retrieves the used cleaning body 1 by utilizing the movement of the tool body 20 and the extension part 30 relative to each other. Details of the configurations of the cleaning tool 10 that form the aforementioned rotation mechanism and the feeding mechanism are described below.

The tool body 20 is a member forming a body of the cleaning tool 10. As illustrated in FIG. 1B, the tool body 20 includes a body housing 21, a rotating body 22, a moving body 23, the supply reel 24, the take-up reel 25, and a coil spring 26.

The body housing 21 is a member configured to house the moving body 23 such that the moving body 23 can retreat. An opening is formed on the front side of the body housing 21 and the extension part 30 extends out forward from the opening. A portion (rear portion) of the extension part 30 is housed in the body housing 21.

The rotating body 22 is a member that oscillates and rotates (reciprocates and rotates) about an axis extending in the front-rear direction. In the following description, oscillation and rotation (reciprocation and rotation) are sometimes simply referred to as "rotation". The front side of the rotating body 22 is coupled to the head 40 of the extension part 30. Thus, the head 40 also rotates with the rotating body 22 when the rotating body 22 rotates about the axis extending in the front-rear direction. Moreover, the rotating body 22 is supported on the moving body 23 to be rotatable about the axis extending in the front-rear direction and movement of the rotating body 22 relative to the moving body 23 in the front-rear direction is restricted. Thus, the moving body 23 also moves relative to the body housing 21 in the front-rear direction when the rotating body 22 (and the head 40 of the extension part 30) moves relative to the body housing 21 in the front-rear direction. As illustrated in FIG. 1B, a helical cam groove 22A is formed on an outer peripheral surface of the rotating body 22 and an insertion protrusion 27 located on an inner wall surface of the body housing 21 is fitted to the cam groove 22A. Movement of the body housing 21 (tool body 20) and the extension part 30 relative to each other in the front-rear direction causes the insertion protrusion 27 to move along the helical cam groove 22A. As viewed from the rotating body 22, the movement of the body housing 21 (tool body 20) and the extension part 30 relative to each other in the front-rear direction causes the rotating body 22 to rotate relative to the body housing 21 about the axis extending in the front-rear direction. The head 40 coupled to the rotating body 22 is thereby rotated in the rotating direction about the axis extending in the front-rear direction. In one or more embodiments, the insertion protrusion 27 of the body housing 21 and the cam groove 22A of the rotating body 22 form a rotation mechanism. However, the configuration may be such that the cleaning tool 10 does not have a rotation mechanism and the head 40 does not rotate.

The moving body 23 is a member that moves relative to the body housing 21 in the front-rear direction, together with the extension part 30 and the rotating body 22. The moving body 23 rotatably supports the supply reel 24 and the take-up reel 25. Moreover, the moving body 23 supports the rotating body 22 to be rotatable about the axis extending in the front-rear direction. A spring receiving portion is located in a rear end portion of the moving body 23 and holds one end of the coil spring 26.

The supply reel 24 is a reel that supplies the unused cleaning body 1. The unused cleaning body 1 is wrapped around the supply reel 24.

The take-up reel 25 is a reel around which the used cleaning body 1 is taken up to be retrieved.

The coil spring 26 is an elastic member for restoring a positional relationship between the tool body 20 and the extension part 30. The coil spring 26 is placed between the body housing 21 and the moving body 23. Specifically, a front end portion of the coil spring 26 is held by the spring receiving portion of the moving body 23 while a rear end portion of the coil spring 26 is held by a spring receiving portion of the body housing 21. When the extension part 30 moves rearward relative to the tool body 20 in cleaning of the optical connector 100, the moving body 23 moves rearward relative to the body housing 21 inside the body housing 21 and the coil spring 26 is thereby compressed and deformed. When the compressed and deformed coil spring 26 returns to the original state, the moving body 23 moves forward relative to the body housing 21 inside the body housing 21 and returns to the original position. The extension part 30 thereby moves forward relative to the tool body 20 and returns to the original position.

The feeding mechanism of the cleaning tool 10 in one or more embodiments includes a rack-and-pinion mechanism formed of a rack (not illustrated) fixed to the body housing 21 and a pinion (not illustrated) configured to transmit a rotating motion to the take-up reel 25. A linear motion of the tool body 20 and the extension part 30 relative to each other in the front-rear direction is thereby converted to a rotating motion. When the tool body 20 and the extension part 30 move relative to each other in the front-rear direction in cleaning, the moving body 23 and the body housing 21 move relative to each other in the front-rear direction and this relative movement causes the pinion to rotate. The take-up reel 25 thereby rotates in a take up direction to retrieve the cleaning body 1 and the unused cleaning body 1 corresponding to a retrieval amount of the take-up reel 25 is supplied from the supply reel 24.

The extension part 30 is a member that extends from the tool body 20. The extension part 30 includes a front housing 31 and the head 40.

The front housing 31 is a cylindrical member housing the head 40. The front housing 31 includes an abutting part 31A. The abutting part 31A is a portion that abuts the optical connector 100 (to be more specific, a connector housing 101) in cleaning. The head 40 is exposed through a front opening of the front housing 31.

The head 40 is a member that presses the cleaning body 1 against an end face of the optical connector 100. The head 40 is located in an end portion (front end portion) of the extension part 30. As illustrated in FIGS. 5A and 6A, the cleaning body 1 is wrapped around the pressing surface 40A of the head 40 and the cleaning body 1 is exposed to the outside such that the cleaning body 1 can be pressed against the optical connector 100. The head 40 is retractably housed in the front housing 31 while being biased forward. A detailed configuration of the head 40 is described later.

As illustrated in FIGS. 2A and 2B, the extension part 30 can move relative to the tool body 20 in the front-rear direction. In the pushed state illustrated in FIG. 2B, the extension part 30 retreats into the tool body 20 from the position in the normal state illustrated in FIG. 2A.

In the cleaning of the optical connector 100, as illustrated in FIG. 2C, the cleaning body 1 of the head 40 is pressed against the optical connector 100 (to be more specific, the end face of the ferrule of the optical connector 100) and the tool body 20 is moved forward with the abutting part 31A of the extension part 30 abutting the optical connector 100 (to be more specific, the connector housing 101) (pushing operation). The cleaning tool 10 is thereby transitioned from the normal state illustrated in FIG. 2A to the pushed state illustrated in FIGS. 2B and 2C. When the cleaning tool 10 is removed from the optical connector 100 after the pushing operation, the tool body 20 is moved rearward (pulling operation). The cleaning tool 10 is thereby transitioned from the pushed state illustrated in FIGS. 2B and 2C to the normal state illustrated in FIG. 2A.

The pushing operation and the pulling operation are performed in one cleaning operation. The pushing operation and the pulling operation causes the tool body 20 and the extension part 30 to move relative to each other in the front-rear direction. Then, the cleaning tool 10 converts the linear motion of the tool body 20 and the extension part 30 to the rotating motion with the rack-and-pinion mechanism and rotation force of this motion is utilized to supply the cleaning body 1 and take up (retrieve) the used cleaning body 1.

<Head 40 of Comparative Example>

FIGS. 3A to 3D are explanatory views illustrating how cleaning with a cleaning tool 10 of a comparative example is performed.

Before giving description about the head 40 of the cleaning tool 10 in one or more embodiments, description is given of how the cleaning is performed when the head 40 of the cleaning tool 10 in the comparative example is used. In order to facilitate explanation, in FIGS. 3A to 3D, illustration of the rotation of the head 40 about the axis extending in the front-rear direction is omitted and only the supplying and retrieving of the cleaning body 1 on the pressing surface 40A of the head 40 are illustrated.

Figure 3A:
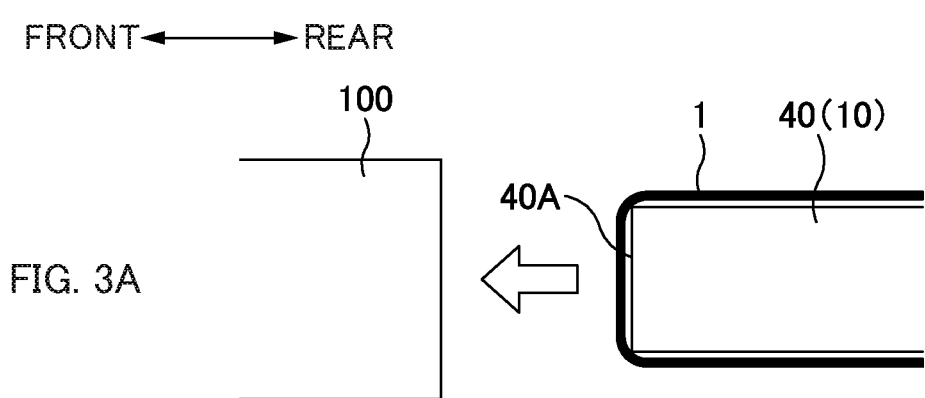
FIGS. 3A to 3D are explanatory views illustrating how cleaning with a cleaning tool 10 in a comparative example is performed.
Figure 3B:
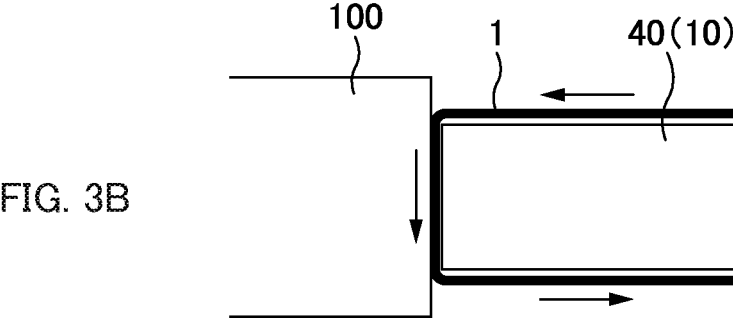

In the cleaning tool 10 in the comparative example, the entire head 40 is made of a resin. First, as illustrated in FIG. 3A, an operator moves the head 40 of the cleaning tool 10 toward the optical connector 100 that is the cleaning target. Note that, before the pressing of the cleaning body 1 against the optical connector 100 with the pressing surface 40A, the cleaning body 1 and the pressing surface 40A are not in contact with each other and are in a state separated from each other. Then, the operator presses the cleaning body 1 against the optical connector 100 with the pressing surface 40A (pushing operation) and the head 40 (extension part 30) thereby moves rearward relative to the tool body 20. This causes the cleaning body 1 to be supplied and the used cleaning body 1 to be taken up (retrieved).

Since the cleaning body 1 is pressed against the optical connector 100 with the pressing surface 40A of the head 40 during the supplying and the retrieving of the cleaning body 1, the cleaning body 1 and the pressing surface 40A are in contact with each other. Accordingly, the cleaning body 1 moves relative to the pressing surface 40A in the direction of the arrows in FIG. 3B while being in contact with the pressing surface 40A. Moreover, since the cleaning body 1 is pressed against the optical connector 100 with the pressing surface 40A of the head 40, the cleaning body 1 and the optical connector 100 are also in contact with each other. Accordingly, the cleaning body 1 moves relative to the optical connector 100 in the direction of the arrows in FIG. 3B while being in contact with the optical connector 100. The optical connector 100 is thereby cleaned. Accordingly, in the stage of FIG. 3B, the cleaning body 1 and the pressing surface 40A are in contact with each other and the cleaning body 1 and the optical connector 100 are in contact with each other.

Figure 3C:
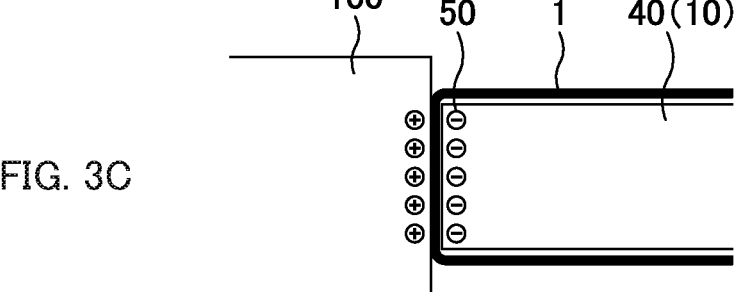

As illustrated in FIG. 3C, the movement of the cleaning body 1 rubbing the pressing surface 40A of the head 40 while being in contact with the pressing surface 40A generates static electricity and forms a state where charges 50 are disproportionately present in the cleaning body 1 and the pressing surface 40A. Specifically, a state where a positive charge 50 is disproportionately present on the cleaning body 1 side and a negative charge 50 is disproportionately present on the pressing surface 40A side is formed. Note that a state where the negative charge 50 is disproportionately present on the cleaning body 1 side and the positive charge 50 is disproportionately present on the pressing surface 40A side may be formed depending on relationships between the material of the cleaning body 1 and the material of the head 40. Description is given below assuming that the state where the positive charge 50 is disproportionately present on the cleaning body 1 side and the negative charge 50 is disproportionately present on the pressing surface 40A side is formed.

Figure 3D:
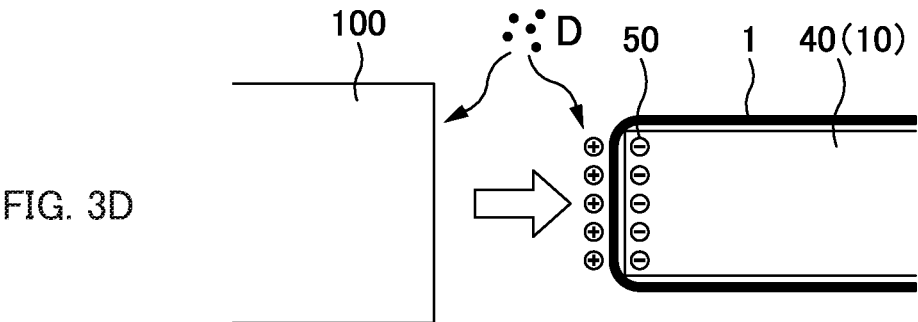

As illustrated in FIG. 3D, when the cleaning tool 10 is removed from the optical connector 100 (pulling operation), the state where the cleaning body 1 is pressed against the optical connector 100 with the pressing surface 40A of the head 40 is canceled and transitions to the state where the cleaning body 1 and the pressing surface 40A are not in contact and are separated from each other again. In this case, the cleaning body 1 side is positively charged and pressing surface 40A side is negatively charged. In the cleaning tool 10 in the comparative example, since the entire head 40 is made of the resin, the head 40 has no route through which the charges 50 can escape and the charged state of the cleaning body 1 and the pressing surface 40A is maintained. When the charged state of the cleaning body 1 and the pressing surface 40A is maintained, as illustrated in FIG. 3D, dust D tends to be attracted to the charged cleaning body 1 and the pressing surface 40A. Moreover, since the cleaning body 1, the pressing surface 40A, and the optical connector 100 are close to one another just after the removal of the cleaning tool 10 from the optical connector 100, the dust D may also attach to the optical connector 100 and this may cause an increase in optical signal loss and the like when the optical connector 100 is coupled.

<Head 40 of the Embodiments>

FIGS. 4A to 4D are explanatory diagrams illustrating how cleaning with the cleaning tool 10 in the first embodiments is performed. In order to facilitate explanation, also in FIGS. 4A to 4D, illustration of the rotation of the head 40 about the axis extending in the front-rear direction is omitted and only the supplying and retrieving of the cleaning body 1 on the pressing surface 40A of the head 40 are illustrated.

Figure 4A:
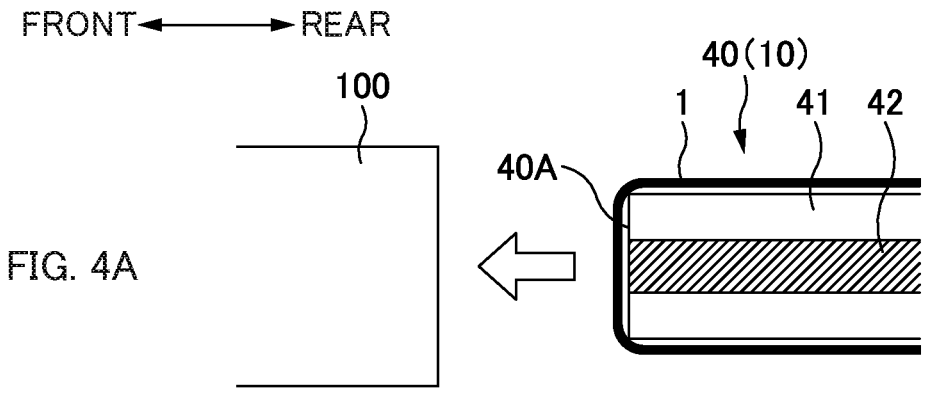
FIGS. 4A to 4D are explanatory diagrams illustrating how cleaning with the cleaning tool 10 in the first embodiments is performed.

In the cleaning tool 10 of the embodiments, the head 40 is not entirely made of a resin and is partially made of a conductor. As illustrated in FIG. 4A, the head 40 includes a conductor part 42 made of the conductor.

As in the cleaning tool 10 in the comparative example, first, as illustrated in FIG. 4A, the operator moves the head 40 of the cleaning tool 10 toward the optical connector 100 that is the cleaning target. Then, the operator presses the cleaning body 1 against the optical connector 100 with the pressing surface 40A (pushing operation) and the head 40 (extension part 30) thereby moves rearward relative to the tool body 20. This causes the cleaning body 1 to be supplied and the used cleaning body 1 to be taken up (retrieved) also in the cleaning tool 10 of the embodiments.

Figure 4B:
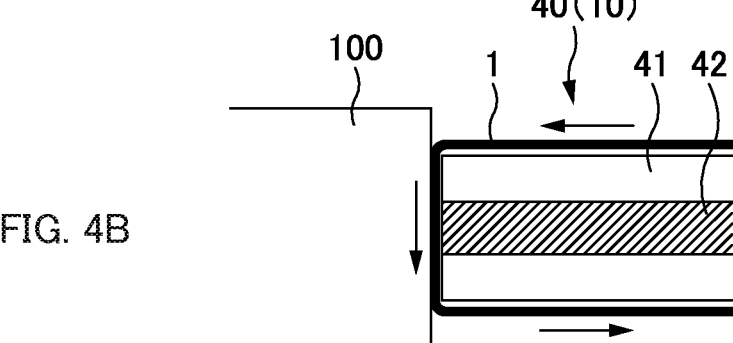

Moreover, also in the cleaning tool 10 of the embodiments, the cleaning body 1 moves relative to the pressing surface 40A in the direction of the arrows in FIG. 4B while being in contact with the pressing surface 40A. Furthermore, the cleaning body 1 moves relative to the optical connector 100 in the direction of the arrows in FIG. 4B while being in contact with the optical connector 100. The optical connector 100 is thereby cleaned. Accordingly, in the stage of FIG. 4B, the cleaning body 1 and the pressing surface 40A (and the conductor 42) are in contact with each other and the cleaning body 1 and the optical connector 100 are in contact with each other.

Figure 4C:
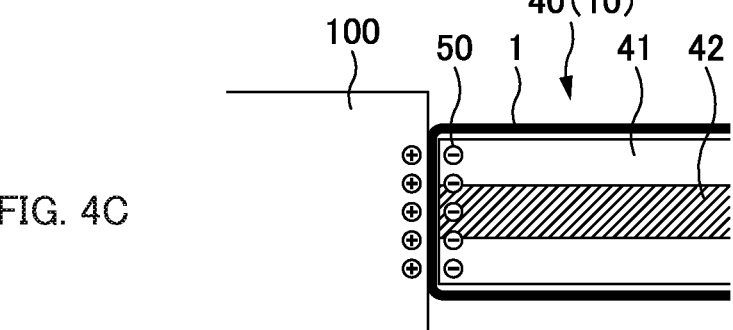
Figure 4D:
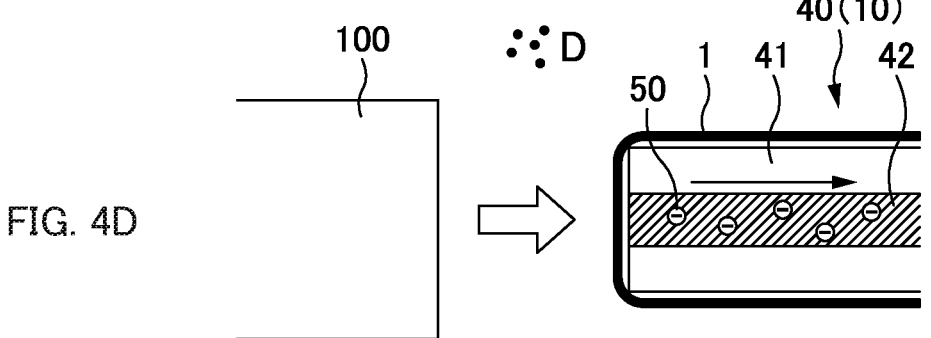

Moreover, also in the cleaning tool 10 of the embodiments, as illustrated in FIG. 4C, the movement of the cleaning body 1 rubbing the pressing surface 40A of the head 40 while being in contact with the pressing surface 40A forms the state where the positive charge 50 is disproportionately present on the cleaning body 1 side and the negative charge 50 is disproportionately present on the pressing surface 40A side. Then, as illustrated in FIG. 4D, when the cleaning tool 10 is removed from the optical connector 100 (pulling operation), the cleaning body 1 is temporarily positively charged and the pressing surface 40A is temporarily negatively charged. In the cleaning tool 10 of the embodiments, since the head 40 is partially made of the conductor, a route through which the charges 50 can escape is formed along the conductor part 42. As illustrated in FIG. 4D, the charges 50 thereby flow along the conductor part 42 and the case where the charged state of the cleaning body 1 and the pressing surface 40A of the head 40 is maintained can be suppressed. Then, the attaching of the dust D to the cleaning body 1, the pressing surface 40A, and the optical connector 100 is suppressed and the increase in optical signal loss in the case where the optical connector 100 is coupled can be suppressed.

Although FIG. 4D illustrates the case where the negative charge 50 flows along the conductor part 42, the positive charge 50 accumulated in the cleaning body 1 also similarly flows along the conductor part 42. In this case, in the stage of FIG. 4D, the cleaning body 1 and the pressing surface 40A (conductor 42) are not in contact and are separated from each other. However, since the cleaning body 1 and the conductor 42 are very close to each other, the positive charge 50 accumulated in the cleaning body 1 can move toward the conductor part 42 side.

Figure 5B:
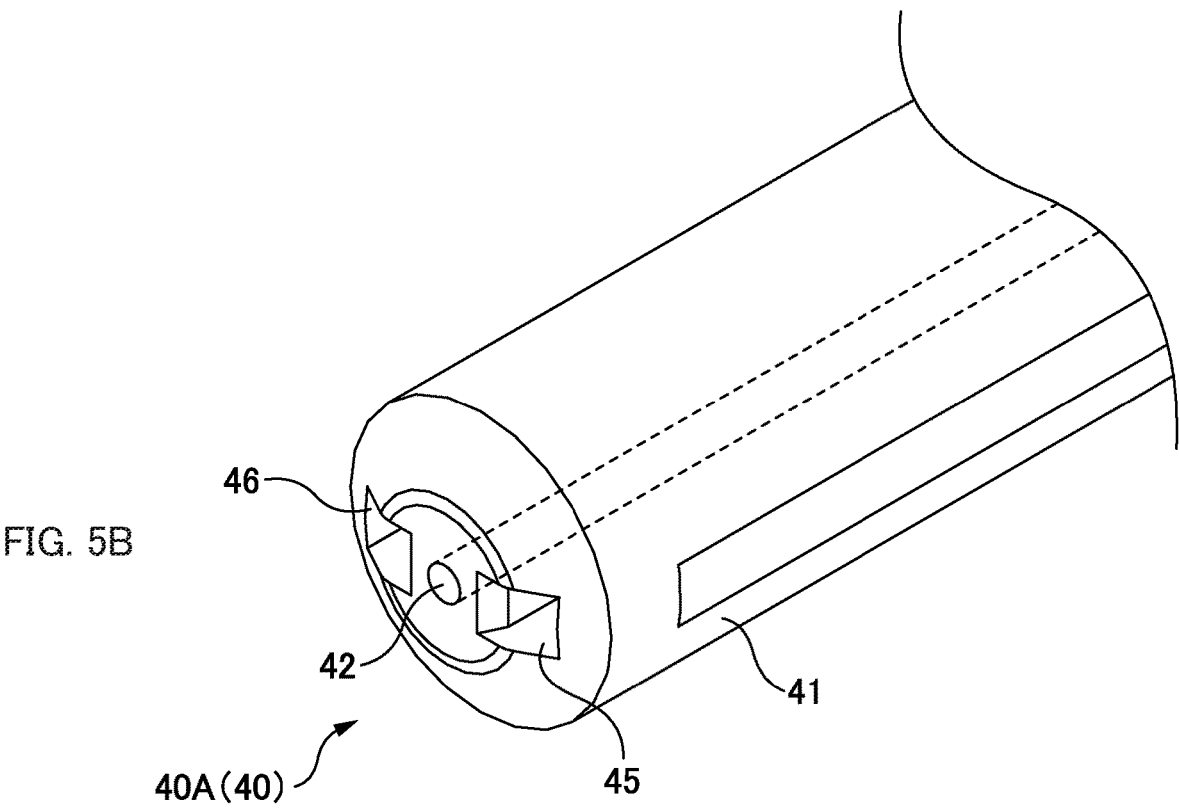
Figure 6B:
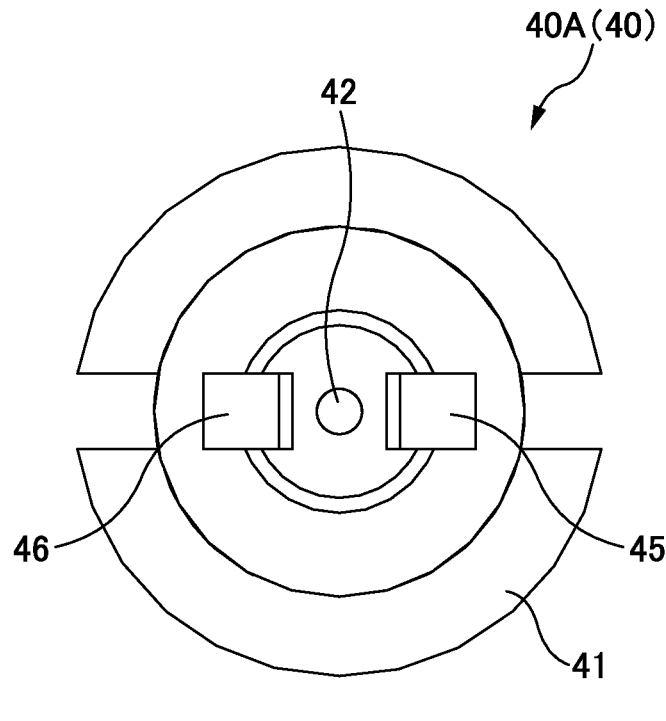

FIGS. 5A and 5B are perspective views of a portion around the head 40 of the cleaning tool 10 in the first embodiments. FIGS. 6A and 6B are front views of the head 40 of the cleaning tool 10 in the first embodiments. FIG. 5B illustrates a state where the cleaning body 1 is removed from FIG. 5A. Moreover, FIG. 6B illustrates a state where the cleaning body 1 is removed from FIG. 6A.

As described above, the head 40 is the member that presses the cleaning body 1 against the end face of the optical connector 100. The head 40 includes a head body 41 and the conductor part 42.

The head body 41 is a member forming a body of the head 40. The head body 41 is made of a resin.

The conductor part 42 is a portion made of a conductor. The conductor is also referred to as an electric conductor and simply as a "conductor". Specifically, the conductor part 42 is made of a metal. Note that the conductor part 42 may be made of a conductor other than metals. As illustrated in FIGS. 5A and 5B, the conductor part 42 is formed to extend in the front-rear direction and, as illustrated in FIGS. 6A and 6B, the conductor part 42 is located in a center portion of the head 40 as viewed in the front-rear direction.

In the views illustrated in FIGS. 5B and 6B of the state where the cleaning body 1 is removed, the conductor part 42 is exposed on the front end face of the head 40. Specifically, the conductor part 42 is placed on the pressing surface 40A of the head 40. Note that the pressing surface 40A is a portion of the head 40 that presses the cleaning body 1 against the optical connector 100. Placing the conductor part 42 on the pressing surface 40A that presses the cleaning body 1 against the optical connector 100 facilitates removal of the charges 50 accumulated in the cleaning body 1 and the pressing surface 40A of the head 40. Note that the conductor part 42 does not have to be placed on the pressing surface 40A of the head 40.

In the embodiments, the position of the front end face of the conductor part 42 and the position of the front end face of the head body 41 are aligned in the front-rear direction. Note that the front end face of the conductor part 42 may be located behind the front end face of the head body 41. This can suppress the case where the conductor part 42 made of the metal comes into contact with the optical connector 100 and breaks the optical connector 100. Moreover, the configuration may be such that the front end face of the conductor part 42 is located behind the front end face of the head body 41 in the normal state and the position of the front end face of the conductor part 42 and the position of the front end face of the head body 41 are aligned in the front-rear direction when the cleaning body 1 is pressed against the optical connector 100. This can suppress the case where the conductor part 42 made of the metal comes into contact with the optical connector 100 and breaks the optical connector 100 and also facilitate removal of the charges 50 accumulated in the cleaning body 1 and the pressing surface 40A of the head 40.

As illustrated in FIGS. 5A and 6A, the cleaning body 1 is wrapped around the pressing surface 40A. As viewed in the front-rear direction (direction in which the head 40 presses the cleaning body 1 against the optical connector 100) illustrated in FIGS. 6A and 6B, the conductor part 42 is placed in a region of the pressing surface 40A where the cleaning body 1 is wrapped around. This can suppress the conductor part 42 made of the metal to come into contact with the optical connector 100 and suppress breakage of the optical connector 100 when the head 40 presses the cleaning body 1 against the optical connector 100. However, the conductor part 42 does not have to be placed in the region of the pressing surface 40A where the cleaning body 1 is wrapped around, as viewed in the front-rear direction.

As illustrated in FIGS. 5A to 6B, the head 40 includes a supply opening 45 from which the cleaning body 1 is supplied to the pressing surface 40A and a retrieve opening 46 to which the cleaning body 1 is retrieved from the pressing surface 40A. Moreover, as illustrated in FIGS. 6A and 6B, the conductor part 42 is placed between the supply opening 45 and the retrieve opening 46. This can suppress the conductor part 42 to come into contact with the optical connector 100 and suppress breakage of the optical connector 100 when the head 40 presses the cleaning body 1 against the optical connector 100. Note that the conductor part 42 does not have to be placed between the supply opening 45 and the retrieve opening 46.

As described above, the cleaning body 1 used in the cleaning tool 10 of the embodiments is formed in a string shape. Moreover, the head body 41 is made of the resin. This can suppress contact of the conductor part 42 made of the metal with the optical connector 100 and also suppress breakage of the optical connector 100 due to contact of the head body 41 with the optical connector 100 when the head 40 presses the string-shaped cleaning body 1 against the cleaning target.

<Removing Electric Charges from Cleaning Tool 10>

First Example

Figure 7A:
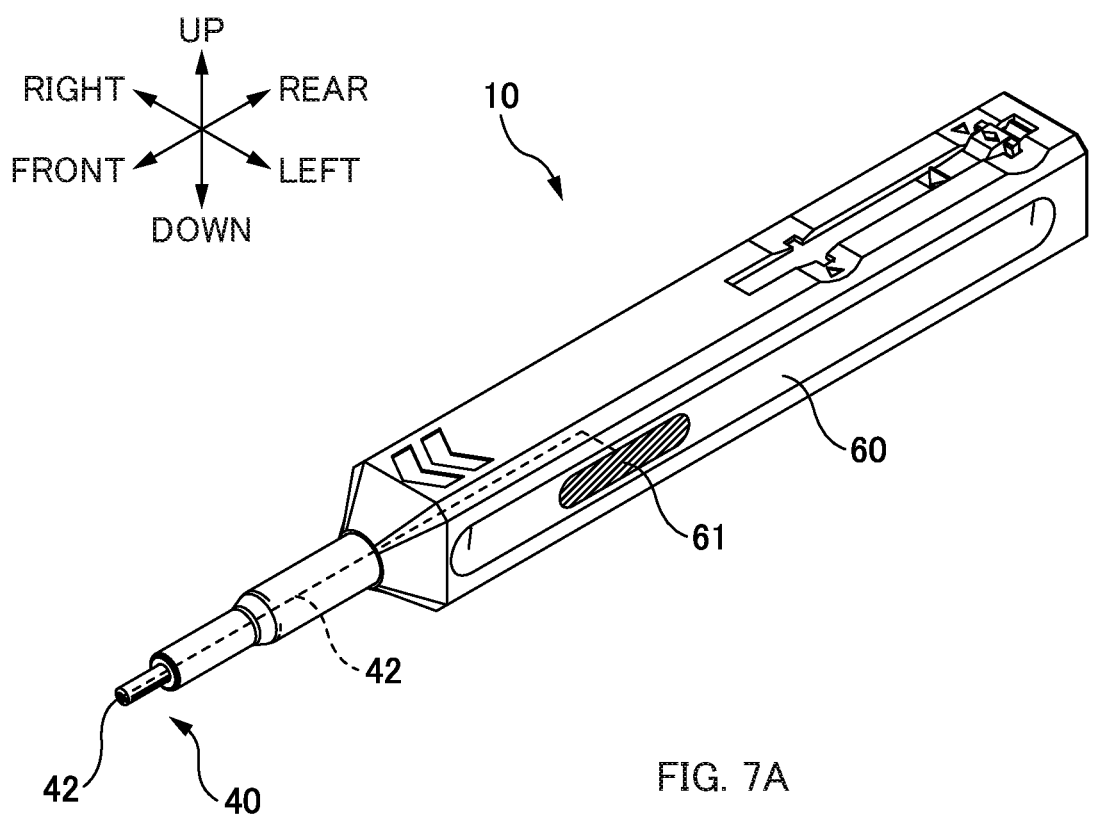
FIGS. 7A and 7B are explanatory views illustrating a first example of removing electric charges from the cleaning tool 10.
Figure 7B:
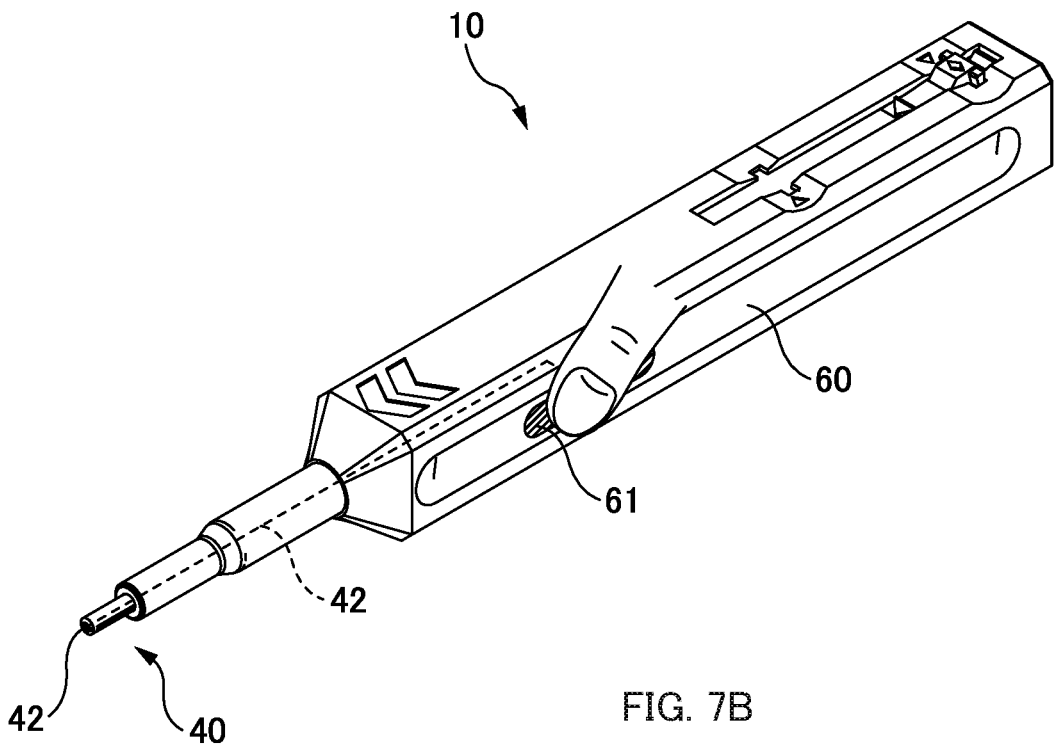

FIGS. 7A and 7B are explanatory views illustrating a first example of removing electric charges from the cleaning tool 10.

As illustrated in FIG. 7A, in the embodiments, the tool body 20 includes an operation part 60 which is operated by an operator in cleaning work. Moreover, a touch part 61 is located in a portion of the operation part 60. The touch part 61 is a portion electrically coupled to the conductor part 42. As illustrated in FIG. 7B, causing the operator to perform the cleaning work while touching the touch part 61 enables the charges 50 flowing along the conductor part 42 to be removed from the cleaning tool 10 via the human body. Note that the touch part 61 may be located not in a portion of the operation part 60 but in the entire operation part 60. Moreover, a touch part 61 does not have to be included.

Second Example

Figure 8A:
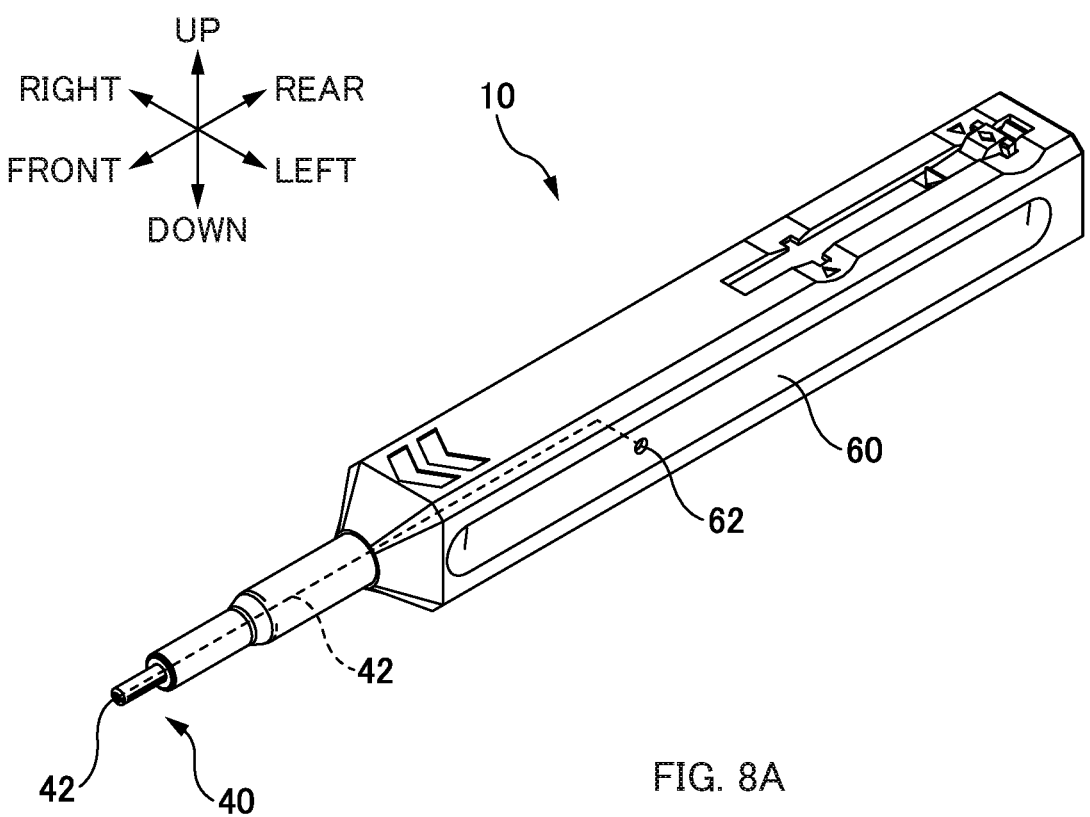
FIGS. 8A and 8B are explanatory views illustrating a second example of removing electric charges from the cleaning tool 10.
Figure 8B:
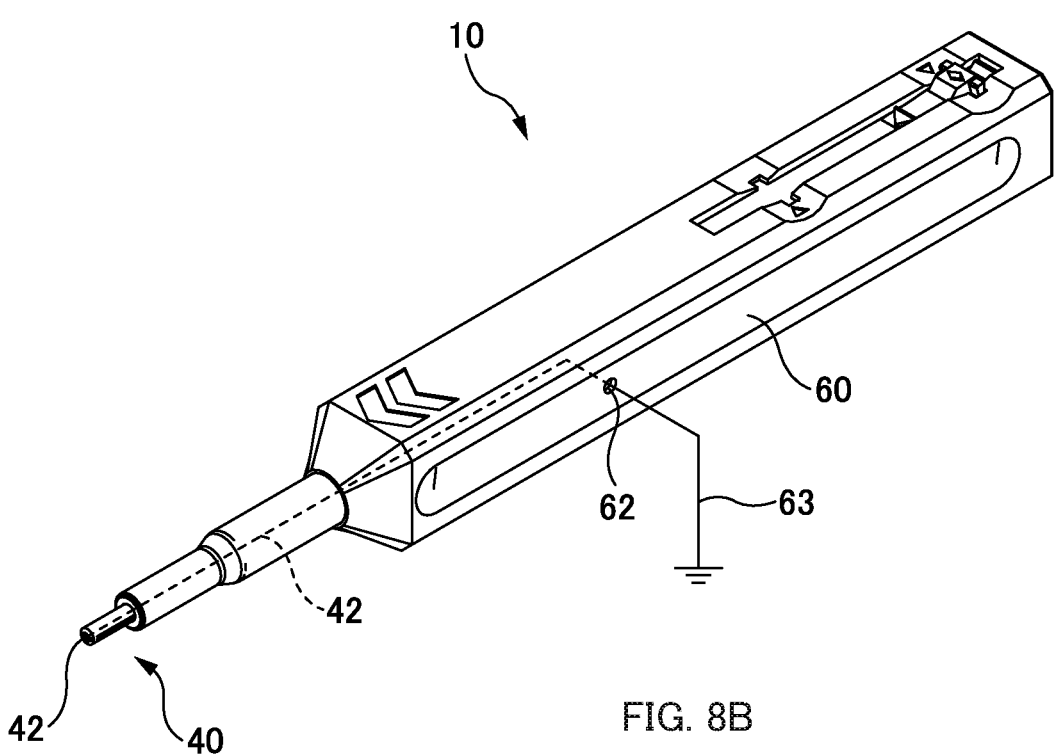

FIGS. 8A and 8B are explanatory views illustrating a second example of removing electric charges from the cleaning tool 10.

As illustrated in FIG. 8A, in the embodiments, the tool body 20 includes a ground terminal 62. The ground terminal 62 is a terminal to which a ground line 63 can be coupled. Then, as illustrated in FIG. 8B, coupling the ground line 63 to the ground terminal 62 can ground the conductor part 42 via the ground terminal 62. Performing the cleaning work with the ground line 63 coupled to the ground terminal 62 enables the charges 50 flowing along the conductor part 42 to be removed from the cleaning tool 10. Note that the configuration may be such that a ground terminal 62 is not included (the ground line 63 cannot be coupled) and the conductor part 42 cannot be grounded.

Second Embodiments

Figures 9A, 9B:
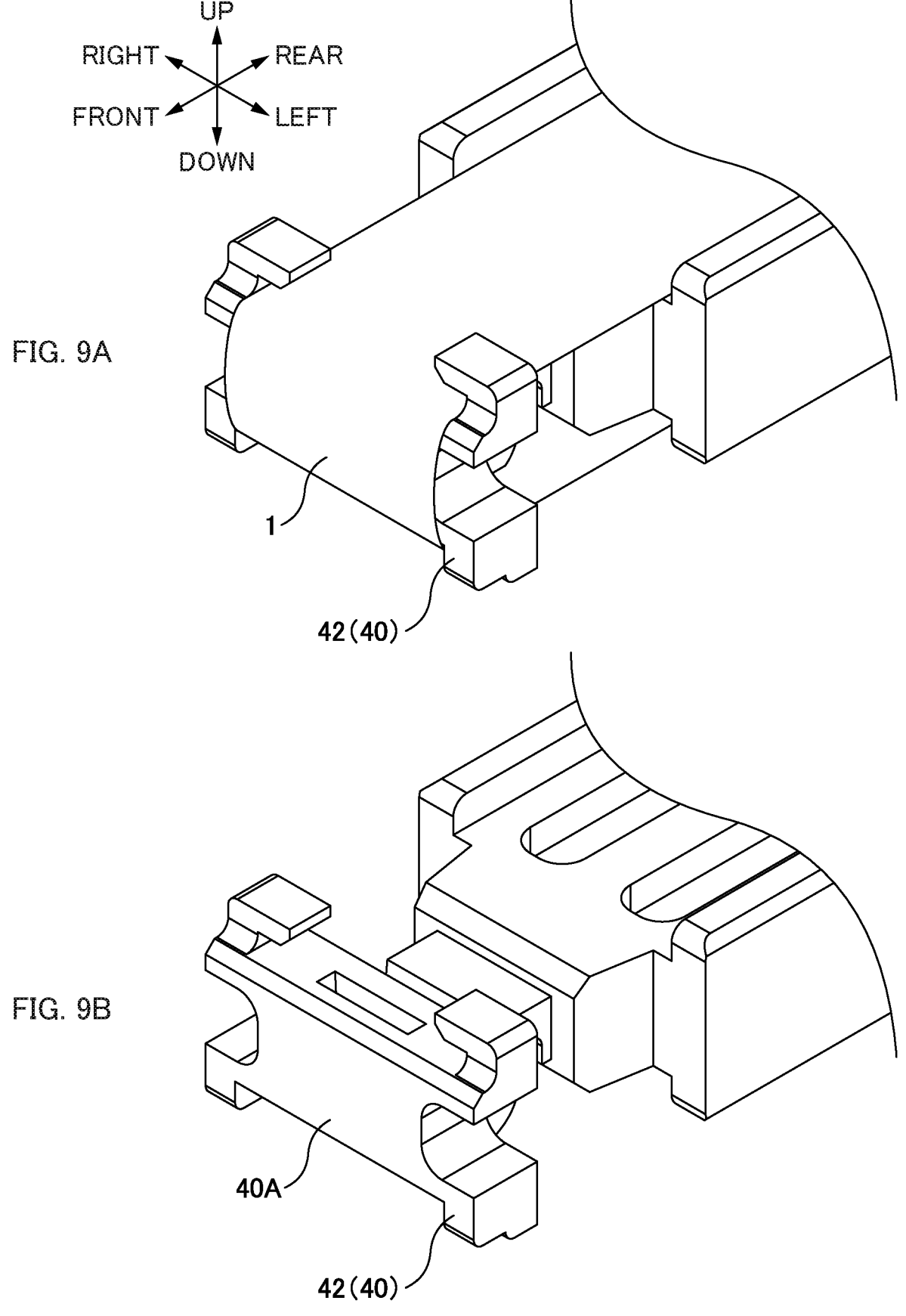
FIGS. 9A and 9B are perspective views of a portion around a head 40 of a cleaning tool 10 in second embodiments.

FIGS. 9A and 9B are perspective views around a portion of a head 40 of a cleaning tool 10 in second embodiments.

In the aforementioned cleaning tool 10 in the first embodiments, the single-core optical connector 100 is the cleaning target and the string-shaped cleaning body 1 is used. As illustrated in FIGS. 9A and 9B, in the cleaning tool of the second embodiments, a tape-shaped cleaning body 1 may be used.

In the cleaning tool 10 of the embodiments, the entire head 40 is formed of the conductor part 42. This is due to the following reason. Unlike the string-shaped cleaning body 1, in the case of the tape-shaped cleaning body 1, the cleaning body 1 is wrapped around the entire pressing surface 40A of the head 40. Accordingly, when the head 40 presses the cleaning body 1 against the optical connector 100, the conductor part 42 made of the metal is less likely to come into contact with the optical connector 100. The escape route of the charges 50 is formed along the conductor part 42 also in the cleaning tool 10 of the embodiments as in the aforementioned cleaning tool 10 of the first embodiments. This can suppress the case where the charged state of the cleaning body 1 and the pressing surface 40A of the head 40 is maintained. Then, it is possible to suppress attaching of the dust D to the cleaning body 1, the pressing surface 40A, and the optical connector 100 and to suppress an increase in optical signal loss when the optical connector 100 is coupled. Note that, in the cleaning tool 10 of the embodiments, the pressing surface 40A of the head 40 made of a resin may be plated with a metal to form the conductor part 42. In other words, the entire head 40 does not have to be formed of the conductor part 42.

Third Embodiments

Figure 10:
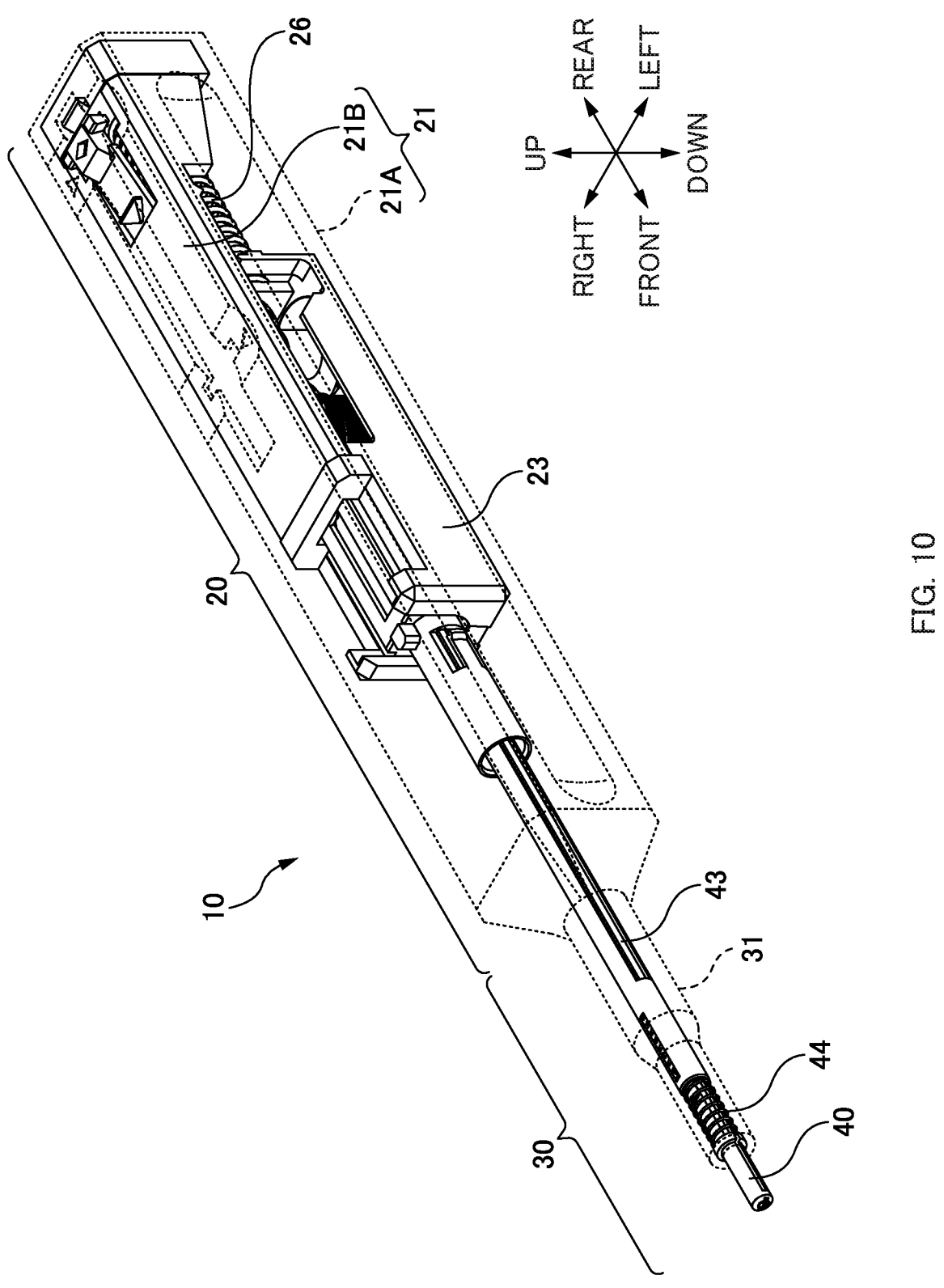
FIG. 10 is a perspective view of a cleaning tool 10 in third embodiments.

FIG. 10 is a perspective view of a cleaning tool 10 in third embodiments. Note that, in FIG. 10, illustration of a cover 21A and the front housing 31 is omitted and only external shapes thereof are illustrated by broken lines. Moreover, configurations, members, and the like of the cleaning tool 100 in the third embodiments that are the same or equivalent to those of the cleaning tool 10 in the first embodiments illustrated in FIGS. 1A and 1B are denoted by the same reference numerals and description thereof is omitted as appropriate.

In the third embodiments, some of the configurations of the cleaning tool 10 are changed from those in the first embodiments. Specifically, in the third embodiments, the head 40 does not include the head body 41 made of the resin and the conductor part 42 made of the metal but a metal plating is formed on the head 40 made of a resin. Note that the metal plating may be formed over the entire head 40 or formed only in a portion of the head 40 such as, for example only on the pressing surface 40A. In the third embodiments, the head 40 is designed to be conductive by forming the metal plating on the head 40 as described above. In the third embodiments, this can suppress the case where the charged state of the cleaning body 1 and the pressing surface 40A of the head 40 is maintained, as in the first embodiments.

Note that the method of designing the head 40 to be conductive is not limited to the case of forming the metal plating on the head 40. For example, the entire head 40 may be formed of a conductive resin instead of forming the metal plating. This can also suppress the case where the charged state of the cleaning body 1 and the pressing surface 40A of the head 40 is maintained, as in the first embodiments.

Moreover, in the third embodiments, not only the head 40 but also the configurations of the cleaning tool 10 other than the head 40 may be designed to be conductive. The cleaning tool 10 includes a head spring 44, a shaft 43, and a fixed body 21B as configurations not illustrated in FIGS. 1A and 1B. The head spring 44 is an elastic member for pressing the head 40 forward. The shaft 43 is a member of the extension part 30 located behind the head 40. The fixed body 21B is a member in which the insertion protrusion 27 (see FIG. 1B) forming the rotation mechanism of the head 40 is located. In the third embodiments, at least one or more of the head spring 44, the shaft 43, and the fixed body 21B may be designed to be conductive to be electrically coupled to the head 40. This can further suppress the case where the charged state of the cleaning body 1 and the pressing surface 40A of the head 40 is maintained.

Moreover, members other than the head spring 44, the shaft 43, and the fixed body 21B may be designed to be conductive. Then, the members designed to be conductive may include ground terminals to enable grounding. The charges can be thereby removed from the cleaning tool 10. Moreover, the cover 21A configured to come into contact with the operator may also be designed to be conductive to enable removing electric charges from the cleaning tool 10 via the human body.

Fourth Embodiments

Figure 11:
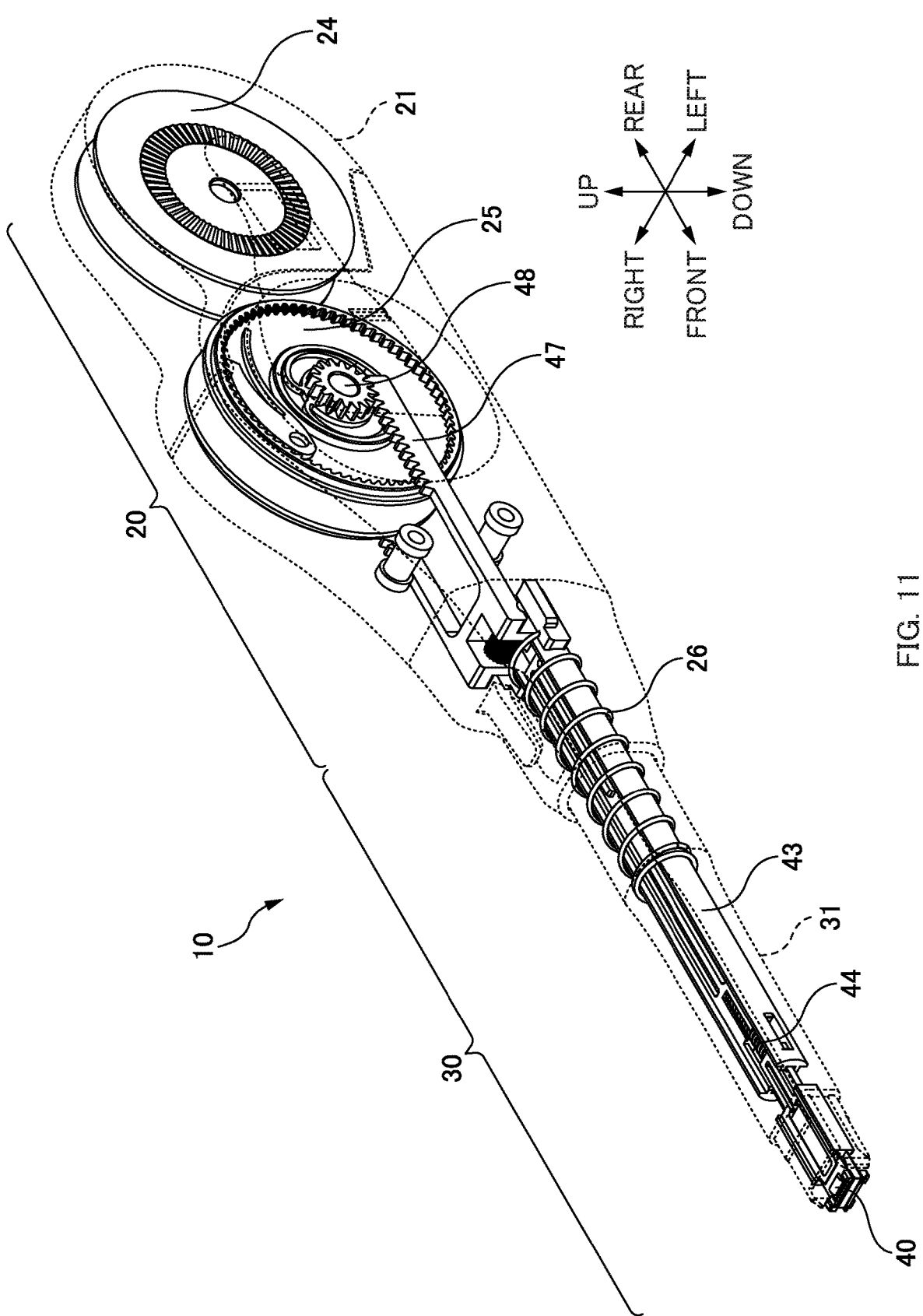
FIG. 11 is a perspective view of a cleaning tool 10 in fourth embodiments.

FIG. 11 is a perspective view of a cleaning tool 10 in fourth embodiments. In the fourth embodiments, some configurations are changed from those in the second embodiments illustrated in FIGS. 9A and 9B. Although FIGS. 9A and 9B illustrate only the portion around the head 40 of the cleaning tool 10, FIG. 11 illustrates the entire cleaning tool 10. Note that, in FIG. 11, illustration of the cover 21A and the front housing 31 is omitted and only external shapes thereof are illustrated by broken lines. Moreover, configurations, members, and the like of the cleaning tool 10 in the fourth embodiments that are the same or equivalent to those of the cleaning tool 10 in the first to third embodiments are denoted by the same reference numerals and description thereof is omitted as appropriate.

The cleaning tool 10 of the fourth embodiments includes the head spring 44, the shaft 43, a rack 47, and a pinion 48 as configurations not illustrated in FIGS. 9A and 9B. The head spring 44 and the shaft 43 have the same configurations as those in the aforementioned third embodiments. Moreover, the rack 47 and the pinion 48 are members forming a rack-and-pinion mechanism that converts the linear motion of the tool body 20 and the extension part 30 relative to each other in the front-rear direction to the rotating motion of the take-up reel 25. In the fourth embodiments, at least one or more of the head spring 44, the shaft 43, and the rack 47 may be designed to be conductive to be electrically coupled to the head 40. This can further suppress the case where the charged state of the cleaning body 1 and the pressing surface 40A of the head 40 is maintained. Note that, as in the third embodiments, members other than the head spring 44, the shaft 43, and the rack 47 may be designed to be conductive.

Others

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 cleaning body,
10 cleaning tool,
20 tool body,
21 body housing,
21A cover,
21B fixed body,
22 rotating body,
22A cam groove,
23 moving body,
24 supply reel,
25 take-up reel,
26 coil spring,
27 insertion protrusion,
30 extension part,
31 front housing,
31A abutting part,
40 head,
40A pressing surface,
41 head body,
42 conductor part,
43 shaft,
44 head spring,
45 supply opening,
46 retrieve opening,
47 rack,
48 pinion,
50 charge,
60 operation part,
61 touch part,
62 ground terminal,
63 ground line,
100 optical connector,
101 connector housing

The invention claimed is:

1. A cleaning tool comprising:

a tool body; and an extension part extending from the tool body and comprising a head configured to press a cleaning body against a cleaning target, wherein the head comprises a conductor part made of a conductor, and the conductor part is configured to move with respect to a pressing surface of the head between:

a first position where a front end face of the conductor part is behind the pressing surface, and a second position where the conductor part is exposed on the pressing surface of the head and presses the cleaning body against the cleaning target.

2. The cleaning tool according to claim 1, wherein the cleaning body is wrapped over a region of the pressing surface when viewed in a direction in which the head presses the cleaning body against the cleaning target, and the conductor part is disposed in the region.

3. The cleaning tool according to claim 1, wherein the head further comprises:

a supply opening from which the cleaning body is supplied to the pressing surface; and a retrieve opening to which the cleaning body is retrieved from the pressing surface, and the conductor part is disposed between the supply opening and the retrieve opening.

4. The cleaning tool according to claim 1, wherein the cleaning body is in a string shape, and the head further comprises a head body made of a resin.

5. The cleaning tool according to claim 1, wherein the cleaning body is in a tape shape, and the head is made of the conductor.

6. The cleaning tool according to claim 1, wherein the tool body comprises a ground terminal, and the conductor part of the head is capable of being grounded via the ground terminal.

7. The cleaning tool according to claim 1, further comprising:

a feeder that supplies the cleaning body to the head in a state where the head presses the cleaning body against the cleaning target.

8. The cleaning tool according to claim 1, wherein in the second position, the front end face of the conductor part is aligned in a front-rear direction of the cleaning tool with the pressing surface of the head, and the conductor part is configured to be in the first position when the extension part is not pushed into the tool body.

9. The cleaning tool according to claim 1, wherein the tool body comprises an operation part configured to be operated by an operator, and the conductor part of the head is electrically coupled to at least a portion of the operation part.

10. The cleaning tool according to claim 9, further comprising:

a front housing; and a body housing in which the operation part is disposed, wherein the front housing and at least a portion of the body housing are conductive to be electrically coupled to the conductor part.

\* \* \* \* \*